United States Patent
Resendes et al.

(10) Patent No.: US 7,282,548 B2
(45) Date of Patent: Oct. 16, 2007

(54) PROCESS FOR PRODUCTION OF HIGH-ISOPRENE BUTYL RUBBER

(75) Inventors: R. Resendes, Sarnia (CA); Gabor Kaszas, London (CA); Mark J. Drewitt, Sarnia (CA); Stephan Glander, Leverkusen (DE); Gerhard Langstein, Kurten (DE); Martin Bohnenpoll, Leverkusen (DE)

(73) Assignee: Lanxess Inc., Sarnia, Ontario (CA)

( * ) Notice: Subject to any disclaimer, the term of this patent is extended or adjusted under 35 U.S.C. 154(b) by 84 days.

(21) Appl. No.: 10/776,761

(22) Filed: Feb. 11, 2004

(65) Prior Publication Data
US 2005/0043440 A1 Feb. 24, 2005

(30) Foreign Application Priority Data
Feb. 14, 2003 (CA) .................................. 2418884

(51) Int. Cl.
*C08F 4/14* (2006.01)
*C08F 210/12* (2006.01)

(52) U.S. Cl. .................. 526/237; 526/336; 526/339

(58) Field of Classification Search ................ 526/237, 526/339, 336
See application file for complete search history.

(56) References Cited

U.S. PATENT DOCUMENTS

| | | | |
|---|---|---|---|
| 2,356,128 A | 8/1944 | Thomas et al. | 260/79 |
| 4,171,414 A | 10/1979 | Wagensommer et al. | 526/185 |
| 4,215,022 A | 7/1980 | Buckley et al. | 260/5 |
| 4,269,955 A | 5/1981 | Wagensommer et al. | 526/165 |
| 6,015,841 A | 1/2000 | Langstein et al. | 522/29 |
| 6,562,916 B2 | 5/2003 | Langstein et al. | 526/89 |
| 6,699,950 B1 | 3/2004 | Ismeier et al. | 526/327 |
| 2001/0014726 A1 | 8/2001 | Langstein et al. | 526/217 |
| 2002/0086959 A1 | 7/2002 | Langstein et al. | 526/157 |
| 2003/0187173 A1 | 10/2003 | Kaszas | 526/339 |
| 2003/0199647 A1 | 10/2003 | Langstein et al. | 526/89 |

FOREIGN PATENT DOCUMENTS

WO 02/16452 A1 * 2/2002

OTHER PUBLICATIONS

Ullmanns Encyclopedia of Industrial Chemistry, vol. A 23 (month unavailable) 1993, pp. 288-295, "Rubber, 3. Synthetic".
Rubber Chemistry & Technology 49, (month unavailable) 1976, pp. 960-966, W.A. Thaler and D.J. Buckley Sr., Meeting of the Rubber Division, ACS, Cleveland, Ohio, May 6-9, 1975, High-Molecular-Weight, High-Unsaturation Copolymers of Isobutylene and Conjugated Dienes. I. Synthesis.

* cited by examiner

*Primary Examiner*—Fred Teskin
(74) *Attorney, Agent, or Firm*—Jennifer R. Seng

(57) ABSTRACT

The present invention relates to a continuous process for producing polymers at conversions ranging from 50% to 95% having a Mooney viscosity of at least 25 Mooney-units and a gel content of less than 15 wt. % containing repeating units derived from at least one isoolefin monomer, more than 4.1 mol % of repeating units derived from at least one multiolefin monomer and optionally further copolymerizable monomers in the presence of $AlCl_3$ and a suitable proton source (e.g. water) or cationogen and at least one multiolefin cross-linking agent wherein the process is conducted in the absence of transition metal compounds and organic nitro compounds.

8 Claims, No Drawings

PROCESS FOR PRODUCTION OF HIGH-ISOPRENE BUTYL RUBBER

FIELD OF THE INVENTION

The present invention relates to a continuous process for producing polymers at conversions ranging from 50% to 95% with a Mooney viscosity of at least 25 Mooney-units and a gel content of less than 15 wt. % containing repeating units derived from at least one isoolefin monomer, more than 4.1 mol % of repeating units derived from at least one multiolefin monomer and optionally further copolymerizable monomers in the presence of $AlCl_3$ and a suitable proton source (e.g. water) or cationogen and at least one multiolefin cross-linking agent wherein the process is conducted in the absence of transition metal compounds and organic nitro compounds.

BACKGROUND OF THE INVENTION

Butyl rubber is understood to be a copolymer of an isoolefin and one or more, preferably conjugated, multiolefins as comonomers. Commercial butyl comprises a major portion of isoolefin and a minor amount, not more than 2.5 mol %, of a conjugated multiolefin. Halogenated butyls are also well known in the art, and possess outstanding properties such as oil and ozone resistance and improved impermeability to air. Commercial halobutyl rubber is a halogenated copolymer of isobutylene and up to about 2.5 mol % of isoprene.

Butyl rubber or butyl polymer is generally prepared in a slurry process using methyl chloride as a vehicle and a Friedel-Crafts catalyst as part of the polymerization initiator. The use of methyl chloride is advantageous because $AlCl_3$, a relatively inexpensive Friedel-Crafts catalyst, is soluble in methyl chloride, as are the isobutylene and isoprene comonomers. Additionally, the butyl rubber polymer is insoluble in the methyl chloride and precipitates out of solution as fine particles. The polymerization is generally carried out at temperatures of about −90° C. to −100° C. See U.S. Pat. No. 2,356,128 and *Ullmanns Encyclopedia of Industrial Chemistry*, volume A 23, 1993, pages 288-295. Low polymerization temperatures are required in order to achieve molecular weights which are sufficiently high for rubber applications.

Raising the reaction temperature or increasing the quantity of isoprene in the monomer feed results in poorer product properties, in particular, in lower molecular weights. However, a higher degree of unsaturation would be desirable for more efficient crosslinking with other, highly unsaturated diene rubbers (BR, NR or SBR).

The molecular weight depressing effect of diene comonomers may, in principle, be offset by lower reaction temperatures. However, in this case the secondary reactions, which result in gelation, occur to a greater extent and these processes are more costly. Gelation at reaction temperatures of around −120° C. and possible options for the reduction thereof have been described (cf. W. A. Thaler, D. J. Buckley Sr., Meeting of the Rubber Division, ACS, Cleveland, Ohio, May 6-9, 1975, published in *Rubber Chemistry & Technology* 49, 960-966 (1976)). The auxiliary solvents such as $CS_2$ required for this purpose are not only difficult to handle, but must also be used at relatively high concentrations. A further disadvantage associated with the use of $CS_2$ lies in the fact that polymerization reactions of this type are homogeneous in nature. Consequently, there are significant increases in solution viscosity as the polymerization reaction proceeds. This in turn necessitates carrying out these polymerizations to lower conversions (i.e. lower amounts of polymer per unit volume of solvent and therefore a cost disadvantage) as high solution viscosities give rise to heat transfer problems.

It is furthermore known to perform gel-free copolymerization of isobutene with various comonomers to yield products of a sufficiently high molecular weight for rubber applications at temperatures of around −40° C. using pretreated vanadium tetrachloride (EP-A1-818 476), a combination of nitro compounds and vanadium (EP-A-1 122 267) or zirconium compounds (WO-02/18460-A1) and others. The present invention operates in the absence of vanadium-, zirconium- and/or hafnium compounds.

SUMMARY OF THE INVENTION

The present invention provides a continuous process for producing polymers having a Mooney viscosity of at least 25 Mooney-units and a gel content of less than 15 wt. % containing repeating units derived from at least one isoolefin monomer, more than 4.1 mol % of repeating units derived from at least one multiolefin monomer and optionally further copolymerizable monomers in the presence of $AlCl_3$ and a proton source and/or cationogen capable of initiating the polymerization process and at least one multiolefin cross-linking agent wherein the process is conducted in the absence of transition metal compounds.

The present invention also provides a continuous slurry process for producing polymers having a Mooney viscosity of at least 25 Mooney-units and a gel content of less than 15 wt. % comprising repeating units derived from isobutene monomer, more than 4.1 mol % of repeating units derived from isoprene monomer and optionally further copolymerizable monomers in the presence of $AlCl_3$ and a proton source and/or cationogen capable of initiating the polymerization process and at least one multiolefin cross-linking agent wherein the process is conducted in the absence of transition metal compounds and organic nitro compounds.

DETAILED DESCRIPTION OF THE INVENTION

The Mooney viscosity of the polymer is determined using ASTM test D1646 using a large rotor at 125° C., a preheat phase of 1 min, and an analysis phase of 8 min (ML1+8 @ 125° C.)

The present invention is not limited to a special isoolefin. However, isoolefins within the range of from 4 to 16 carbon atoms, preferably 4-7 carbon atoms, such as isobutene, 2-methyl-1-butene, 3-methyl-1-butene, 2-methyl-2-butene, 4-methyl-1-pentene and mixtures thereof are preferred. More preferred is isobutene.

The present invention is not limited to a special multiolefin. Every multiolefin copolymerizable with the isoolefin known by the skilled in the art can be used. However, multiolefins with in the range of from 4-14 carbon atoms, such as isoprene, butadiene, 2-methylbutadiene, 2,4-dimethylbutadiene, piperyline, 3-methyl-1,3-pentadiene, 2,4-hexadiene, 2-neopentylbutadiene, 2-methly-1,5-hexadiene, 2,5-dimethly-2,4-hexadiene, 2-methyl-1,4-pentadiene, 2-methyl-1,6-heptadiene, cyclopenta-diene, methylcyclopentadiene, cyclohexadiene, 1-vinyl-cyclohexadiene and mixtures thereof, preferably conjugated dienes, are used. Isoprene is more preferably used.

In the present invention, β-pinene can also be used as a co-monomer for the isoolefin.

As optional monomers every monomer copolymerizable with the isoolefins and/or dienes known by the skilled in the art can be used. α-methyl styrene, p-methyl styrene, chlorostyrene, cyclopentadiene and methylcyclopentadiene are preferably used. Indene and other styrene derivatives may also be used in the present invention.

The multiolefin content is at least greater than 4.1 mol %, more preferably greater than 5.0 mol %, even more preferably greater than 6.0 mol %, most preferably greater than 7.0 mol %.

Preferably, the monomer mixture contains in the range of from 80% to 95% by weight of at least one isoolefin monomer and in the range of from 4.0% to 20% by weight of at least one multiolefin monomer including β-pinene and in the range of from 0.01% to 1% by weight of at least one multiolefin cross-linking agent. More preferably, the monomer mixture contains in the range of from 83% to 94% by weight of at least one isoolefin monomer and in the range of from 5.0% to 17% by weight of a multiolefin monomer or β-pinene and in the range of from 0.01% to 1% by weight of at least one multiolefin cross-linking agent. Most preferably, the monomer mixture contains in the range of from 85% to 93% by weight of at least one isoolefin monomer and in the range of from 6.0% to 15% by weight of at least one multiolefin monomer, including β-pinene and in the range of from 0.01% to 1% by weight of at least one multiolefin cross-linking agent.

The weight average molecular weight, $M_w$, is preferably greater than 240 kg/mol, more preferably greater than 300 kg/mol, even more preferably greater than 500 kg/mol, most preferably greater than 600 kg/mol.

In connection with the present invention the term "gel" is understood to denote a fraction of the polymer insoluble for 60 min in cyclohexane boiling under reflux. The gel content is preferably less than 10 wt. %, more preferably less than 5 wt %, even more preferably less than 3 wt %, most preferably less than 1 wt %.

The polymerization is performed in the presence of $AlCl_3$ and a proton source and/or cationogen capable of initiating the polymerization process. A proton source according to the present invention includes any compound that will produce a proton when added to $AlCl_3$ or a composition containing $AlCl_3$. Protons may be generated from the reaction of $AlCl_3$ with proton sources such as water, alcohol or phenol to produce the proton and the corresponding by-product. Such reaction may be preferred in the event that the reaction of the proton source is faster with the protonated additive as compared with its reaction with the monomers. Other proton generating reactants include thiols, carboxylic acids, and the like. According to the present invention, when low molecular weight polymer product is desired an aliphatic or aromatic alcohol is preferred. The most preferred proton source is water. The preferred ratio of $AlCl_3$ to water is between 5:1 to 100:1 by weight. It may be advantageous to further introduce $AlCl_3$ derivable catalyst systems, diethylaluminium chloride, ethylaluminium chloride, titanium tetrachloride, stannous tetrachloride, boron trifluoride, boron trichloride, or methylalumoxane.

In addition or instead of a proton source a cationogen capable of initiating the polymerization process can be used. A cationogen according to the present invention includes any compound that generates a carbo-cation under the conditions present. A preferred group of cationogens include-carbocationic compounds having the formula:

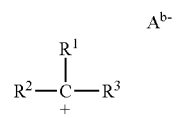

wherein $R^1$, $R^2$ and $R^3$, are independently hydrogen, or a linear, branched or cyclic aromatic or aliphatic group, with the proviso that only one of $R^1$, $R^2$ and $R^3$ may be hydrogen. Preferably, $R^1$, $R^2$ and $R^3$, are independently a $C_1$ to $C_{20}$ aromatic or aliphatic group. Non-limiting examples of suitable aromatic groups may be selected from phenyl, tolyl, xylyl and biphenyl. Non-limiting examples of suitable aliphatic groups include methyl, ethyl, propyl, butyl, pentyl, hexyl, octyl, nonyl, decyl, dodecyl, 3-methylpentyl and 3,5,5-trimethylhexyl.

Another preferred group of cationogens includes substituted silylium cationic compounds having the formula:

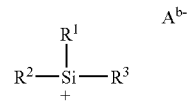

wherein $R^1$, $R^2$ and $R^3$, are independently hydrogen, or a linear, branched or cyclic aromatic or aliphatic group, with the proviso that only one of $R^1$, $R^2$ and $R^3$ may be hydrogen. Preferably, none of $R^1$, $R^2$ and $R^3$ are H. Preferably, $R^1$, $R^2$ and $R^3$ are, independently, a $C_1$ to $C_{20}$ aromatic or aliphatic group. More preferably, $R^1$, $R^2$ and $R^3$ are independently a $C_1$ to $C_8$ alkyl group. Examples of useful aromatic groups may be selected from phenyl, tolyl, xylyl and biphenyl. Non-limiting examples of useful aliphatic groups include methyl, ethyl, propyl, butyl, pentyl, hexyl, octyl, nonyl, decyl, dodecyl, 3-methylpentyl and 3,5,5-trimethylhexyl. A preferred group of reactive substituted silylium cations include trimethylsilylium, triethylsilylium and benzyldimethylsilylium. Such cations may be prepared, for example, by the exchange of the hydride group of the $R^1R^2R^3Si$—H with a non-coordinating anion (NCA), such as $Ph_3C^+B(pfp)_4^-$ yielding compositions such as $R^1R^2R^3SiB(pfp)_4$ which in the appropriate solvent obtain the cation.

According to the present invention, $A^{b-}$ denotes an anion. Preferred anions include those containing a single coordination complex possessing a charge bearing metal or metalloid core which is negatively charged to the extent necessary to balance the charge on the active catalyst species which may be formed when the two components are combined. More preferably $A^{b-}$ corresponds to a compound with the general formula $[MQ_4]^-$ wherein M is a boron, aluminum, gallium or indium in the +3 formal oxidation state; and Q is independently selected from hydride, dialkylamido, halide, hydrocarbyl, hydrocarbyloxide, halo-substituted hydrocarbyl, halo-substituted hydrocarbyloxide, and halo-substituted silylhydrocarbyl radicals.

Preferably, there are no organic nitro compounds or transition metals used in the process according to the present invention.

The reaction mixture used to produce the present butyl polymer further contains a multiolefin cross-linking agent. The term cross-linking agent is known to those skilled in the art and is understood to denote a compound that causes chemical cross-linking between the polymer chains in opposition to a monomer that will add to the chain. Some easy preliminary tests will reveal if a compound will act as a monomer or a cross-linking agent. The choice of the cross-linking agent is not restricted. Preferably, the cross-linking contains a multiolefinic hydrocarbon compound. Examples of these include norbornadiene, 2-isopropenylnorbornene, 2-vinyl-norbornene, 1,3,5-hexatriene, 2-phenyl-1,3-butadiene, divinylbenzene, diisopropenylbenzene, divinyltoluene, divinylxylene and $C_1$ to $C_{20}$ alkyl-substituted derivatives thereof. More preferably, the multiolefin crosslinking agent is divinyl-benzene, diisopropenylbenzene, divinyltoluene, divinyl-xylene and $C_1$ to $C_{20}$ alkyl substituted derivatives thereof, and or mixtures of the compounds given. Most preferably the multiolefin crosslinking agent contains divinylbenzene and diisopropenylbenzene.

The polymerization can be performed in a continuous process in slurry (suspension), in a suitable diluent, such as chloroalkanes as described in U.S. Pat. No. 5,417,930.

The monomers are generally polymerized cationically, preferably at temperatures in the range from −120° C. to +20° C., preferably in the range from −100° C. to −20° C., and pressures in the range from 0.1 to 4 bar.

The use of a continuous reactor as opposed to a batch reactor seems to have a positive effect on the process. Preferably, the process is conducted in at least one continuous reactor having a volume of between 0.1 $m^3$ and 100 $m^3$, more preferable between 1 $m^3$ and 10 $m^3$.

Inert solvents or diluents known to the person skilled in the art for butyl polymerization may be considered as the solvents or diluents (reaction medium). These include alkanes, chloroalkanes, cycloalkanes or aromatics, which are frequently also mono- or polysubstituted with halogens. Hexane/chloroalkane mixtures, methyl chloride, dichloromethane or the mixtures thereof may be preferred. Chloroalkanes are preferably used in the process according to the present invention.

Polymerization is preferably performed continuously. The process is preferably performed with the following three feed streams:

I) solvent/diluent+isoolefin (preferably isobutene)+multiolefin (preferably diene, isoprene)
II) initiator system
III) multiolefin cross-linking agent It should be noted that the multiolefin crosslinking agent can also be added in the same feed stream as the isoolefin and multiolefin.

Using the process according to the present invention, it is possible to produce novel transition metal-free polymers having a Mooney viscosity of at least 25 Mooney-units and a gel content of less than 15 wt. % containing repeating units derived from at least one isoolefin monomer, more than 4.1 mol % of repeating units derived from at least one multiolefin monomer and optionally further copolymerizable monomers in the presence of $AlCl_3$ and a proton source and/or cationogen capable of initiating the polymerization process and at least one multiolefin cross-linking agent having elevated double bond contents and simultaneously low gel contents. The double bond content may be determined by proton magnetic resonance spectroscopy.

These polymers may be the starting material for a halogenation process in order to produce halo-butyl polymers. Preferred are partially or fully chlorinated or brominated polymers having a Mooney viscosity of at least 30 Mooney-units and a gel content of less than 15 wt. % containing repeating units derived from at least one isoolefin monomer, more than 4.1 mol % of repeating units derived from at least one multiolefin monomer and optionally further copolymerizable monomers wherein the polymer does not contain any transition metal catalyst residues or organic nitro compounds residues. Bromination or chlorination can be performed according to the procedures described in Rubber Technology, $3^{rd}$ Ed., Edited by Maurice Morton, Kluwer Academic Publishers, pp. 297-300 and references cited within this reference.

The copolymers presented in the present invention are suitable for the production of moldings of all kinds, in particular tire components and industrial rubber articles, such as bungs, damping elements, profiles, films, coatings. The polymers are used to this end in pure form or as a mixture with other rubbers, such as NR, BR, HNBR, NBR, SBR, EPDM or fluororubbers. The preparation of these compounds is known to those skilled in the art. In most cases carbon black is added as filler and a sulfur based curing system is used. For the compounding and vulcanization it is referred to Encyclopedia of Polymer Science and Engineering, Vol. 4, S. 66 et seq. (Compounding) and Vol. 17, S. 666 et seq. (Vulcanization).

The vulcanization of the compounds is usually effected at temperatures in the range of 100 to 200° C., preferred 130 to 180° C. (optionally under pressure in the range of 10 to 200 bar).

The following Examples are provided to illustrate the present invention:

EXAMPLES

Equipment

Polymer unsaturation was determined through $^1$H NMR spectroscopy with the use of a Bruker $^1$H NMR spectra were obtained on a Bruker 500 MHz NMR Spectrometer. NMR samples used to determine isoprene content were prepared in $CDCl_3$. NMR samples used to determine DVB content were prepared in THF-$d_8$. Microstructure information was calculated with the use of previously established integration methods. Peak shifts were referenced to a TMS internal standard.

GPC analysis was performed with the use of a Waters Alliance 2690 Separations Module and Viscotek Model 300 Triple Detector Array. GPC samples were prepared by dissolution in THF.

Polymer gel content was determined through conventional gravimetric analysis of the dry, hydrocarbon-insoluble fraction (insoluble in boiling cyclohexane, under agitation for a period of 60 minutes).

Chemicals

Isobutene was purified to a level which, to those skilled in the art, is amiable to the production of butyl rubber.

Isoprene was obtained from Exxon Chemical Co and used as received. Isoprene dimer levels were found to be ca. 200 ppm.

Methyl chloride was obtained from Dow Chemical Co. and was dried with the used of deactivated alumina gel prior to use.

DVB (64% pure divinyl-benzene, Dow Chemical Co.) was used. The composition and purity of this DVB was verified by GC analysis. According to the analysis, this material was found to contain 45 wt % m-divinylbenzene (m-DVB), 19.5 wt % p-divinyl-benzene (p-DVB), 24 wt % m-ethylvinylbenzene and 11.5 wt % p-ethylvinylbenzene.

Example 1

The following example illustrates the production of, via a continuous process, a novel grade of IIR possessing an isoprene content of up to 5.0 mol % and Mooney viscosity (ML 1+8 @ 125° C.) between 35 and 40 MU.

The monomer feed composition contained 2.55 wt. % of isoprene (IP or IC5) and 27.5 wt. % of isobutene (IP or IC4). This mixed feed was introduced into the continuous polymerization reactor at a rate of 5900 kg/hour. In addition, DVB was introduced into the reactor at a rate of 5.4 to 6 kg/hour. Polymerization was initiated via the introduction of an $AlCl_3$/MeCl solution (0.23 wt. % of $AlCl_3$ in MeCl) at a rate of 204 to 227 kg/hour. The internal temperature of the continuous reaction was maintained between −95 and −100° C. through the use of an evaporative cooling process. Following sufficient residence within the reactor, the newly formed polymer crumb was separated from the MeCl diluent with the use of an aqueous flash tank. At this point, ca. 1 wt. % of stearic acid was introduced into the polymer crumb. Prior to drying, 0.1 wt. % of Irganox® 1010 was added to the polymer. Drying of the resulting material was accomplished with the use of a conveyor oven. Table 1 details the characteristics of the final material.

Example 2

The following example illustrates the production of, via a continuous process, a novel grade of IIR possessing an isoprene content of up to 8.0 mol % and Mooney viscosity (ML 1+8 @ 125° C.) between 35 and 40 MU.

The monomer feed composition was comprised of 4.40 wt. % of isoprene (IP or IC5) and 25.7 wt. % of isobutene (IP or IC4). This mixed feed was introduced into the continuous polymerization reactor at a rate of 5900 kg/hour. In addition, DVB was introduced into the reactor at a rate of 5.4 to 6 kg/hour. Polymerization was initiated via the introduction of an $AlCl_3$/MeCl solution (0.23 wt. % of $AlCl_3$ in MeCl) at a rate of 204 to 227 kg/hour. The internal temperature of the continuous reaction was maintained between −95 and −100° C. through the use of an evaporative cooling process. Following sufficient residence within the reactor, the newly formed polymer crumb was separated from the MeCl diluent with the use of an aqueous flash tank. At this point, ca. 1 wt. % of Stearic acid was introduced into the polymer crumb. Prior to drying, 0.1 wt. % of Irganox® 1010 was added to the polymer. Drying of the resulting material was accomplished with the use of a conveyor oven. Table 2 details the characteristics of the final material.

Example 3

This comparative example illustrates the production of IIR with a total isoprene level of 7.26 mol % via a batch polymerization process. The catalyst solution was prepared by dissolving anhydrous $AlCl_3$ (1.739 g, 13 mmol, Aldrich 99.99%) in methyl chloride (400 mL) at −30° C., this solution was stirred for 30 minutes prior to being cooled to −95° C. To a 2 L Morton-style reaction vessel cooled to −95° C. and equipped with a over-head stirrer and T-type thermocouple was added methyl chloride (900 mL), isobutene (85.8 g condensed at −95° C.), isoprene (12.3 g) and DVB (0.565 g). A catalyst solution (50 mL) was added to the mixture in a single portion to initiate polymerization. The reaction was allowed to proceed for 10 minutes at which point 10 mL of EtOH/NaOH was added to terminate the reaction followed by 1 phr Irganox 1076. The resultant slurry was allowed to warm to room temperature, during this time the methyl chloride and remaining monomers evaporated and hexanes was added to dissolve the polymer. The polymer was recovered from the hexanes cement by steam coagulation then dried on a 2-roll mill at 135° C. Table 3 details the characteristics of the final material.

Example 4

This comparative example illustrates the production of IIR with a total isoprene level of 7.00 mol % via a batch polymerization process in which no crosslinking agent (e.g. DVB) is present. The catalyst solution was prepared by dissolving anhydrous $AlCl_3$ (0.3 g, Aldrich 99.99%) in methyl chloride (200 mL) at −30° C., this solution was stirred for 30 minutes prior to being cooled to −95° C. To a 2 L Morton-style reaction vessel cooled to −95° C. and equipped with a over-head stirrer and T-type thermocouple was added methyl chloride (900 mL), isobutene (11.82 g condensed at −95° C.), and isoprene (2.04 g). A catalyst solution (22 mL) was added to this mixture in a single portion to initiate polymerization. The reaction was allowed to proceed for 10 minutes at which point 10 mL of EtOH/NaOH was added to terminate the reaction followed by 1 phr Irganox 1076. The resultant slurry was allowed to warm to room temperature, during this time the methyl chloride and remaining monomers evaporated and hexanes was added to dissolve the polymer. The polymer was recovered from the hexanes cement by steam coagulation then dried on a 2-roll mill at 135° C. Table 4 details the characteristics of the final material.

From these examples it can be seen that the preparation of IIR with elevated levels of IP (IC5) and acceptable Mooney viscosities (35-40 MU) can be successfully prepared in a $AlCl_3$/$H_2O$ initiated continuous polymerization process in the presence of DVB (Examples 1 & 2). Although it is possible to prepare IIR with an isoprene content of 7.26 mol in a batch process (with DVB), it is apparent from the data presented in Example 3, that such a material possesses a significantly lower Mooney viscosity, $M_w$, and $M_z$ and is produced at reduced conversions. Similarly, when such a material is produced in the absence of DVB (Example 4), a further reduction in the Mooney and $M_w$ is observed.

TABLE 1

| | |
|---|---|
| Isoprene Content (mol %) | 4.5-5.0 |
| DVB Content (mol %) | 0.07-0.11 |
| Mooney Viscosity (MU, ML1 + 8 @ 125° C.) | 35-40 |
| Gel Content (wt. %) | <5.0 |
| $M_w$ (kg/mol) | 450-550 |
| $M_n$ (kg/mol) | 200-220 |
| $M_z$ (kg/mol) | 900-1400 |
| Conversion (%) | 77-84 |

TABLE 2

| | |
|---|---|
| Isoprene Content (mol %) | 7.0-8.0 |
| DVB Content (mol %) | 0.07-0.11 |
| Mooney Viscosity (MU, ML1 + 8 @ 125° C.) | 35-40 |
| Gel Content (wt. %) | <5.0 |
| $M_w$ (kg/mol) | 700-900 |
| $M_n$ (kg/mol) | 100-105 |
| $M_z$ (kg/mol) | 3200-5500 |
| Conversion (%) | 77-84 |

TABLE 3

| | |
|---|---|
| Isoprene Content (mol %) | 7.26 |
| DVB Content (mol %) | 0.18 |
| Mooney Viscosity (MU, ML1 + 8 @ 125° C.) | 28 |
| Gel Content (wt. %) | <5.0 |
| $M_w$ (kg/mol) | 427 |
| $M_n$ (kg/mol) | 132 |
| $M_z$ (kg/mol) | 1026 |
| Conversion (%) | 50 |

TABLE 4

| | |
|---|---|
| Isoprene Content (mol %) | 7.0 |
| DVB Content (mol %) | N/A |
| Mooney Viscosity (MU, ML1 + 8 @ 125° C.) | 15 |
| Gel Content (wt. %) | <5 |
| $M_w$ (kg/mol) | 358 |
| $M_n$ (kg/mol) | 140 |
| $M_z$ (kg/mol) | 1202 |
| Conversion (%) | 78 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a polymer(s) having a Mooney viscosity of at least 25 Mooney-units and a gel content of less than 15 wt. % comprising repeating units derived from at least one isoolefin monomer, more than 4.1 mol % of repeating units derived from at least one multiolefin monomer comprising mixing at least one isoolefin monomer, at least one multiolefin monomer and optionally further copolymerizable monomers in the presence of $AlCl_3$ and at least one proton source and/or cationogen capable of initiating the polymerization process and at least one multiolefin cross-linking agent,
   wherein the process is conducted in the absence of transition metal compounds and organic nitro compounds,
   wherein the process is continuous, and
   wherein the conversion level of the polymer is between 50% and 95%.

2. A process according to claim 1, wherein the polymer is produced at conversion levels ranging from 60% to 95% and contains greater than 5 mol % of repeat units derived from a multiolefin and a gel content of less than 10 wt. %.

3. A process according to claim 1, wherein the polymer is produced at conversion levels ranging from 75% to 95% and contains greater than 7 mol % of repeat units derived from a multiolefin and a gel content of less than 5 wt. %.

4. A process according to claim 1, wherein said at least one isoolefin monomer is isobutene.

5. A process according to claim 1, wherein the process is conducted in at least one continuous reactor having a volume between 0.1 m³ and 100 m³.

6. A process according to claim 1, wherein the process is conducted in a continuous reactor having a volume between 1 m³ and 10 m³.

7. A process according to claim 1, wherein the multiolefin is isoprene.

8. A process according to claim 1, wherein said multiolefin crosslinking agent is divinylbenzene.

* * * * *